United States Patent [19]

Reiffert et al.

[11] Patent Number: 4,470,481

[45] Date of Patent: Sep. 11, 1984

[54] WICK OILER

[75] Inventors: Werner Reiffert, Bochum; Dieter Peters, Witten; Joachim Wiendahl, Dortmund, all of Fed. Rep. of Germany

[73] Assignee: J. D. Neuhaus, Witten, Fed. Rep. of Germany

[21] Appl. No.: 385,877

[22] Filed: Jun. 7, 1982

[30] Foreign Application Priority Data

Jun. 10, 1981 [DE] Fed. Rep. of Germany ....... 3124043

[51] Int. Cl.³ .............................................. F16N 7/32
[52] U.S. Cl. .................................... 184/55 A; 184/14
[58] Field of Search ................ 184/55 A, 55 R, 56 A, 184/64, 14, 1 R, 102

[56] References Cited

U.S. PATENT DOCUMENTS 2,229,176 1/1941 Kehle ................................ 184/55 A
2,680,496 6/1954 Johnson ............................. 184/55 A
2,767,807 10/1956 Booth ............................... 184/55 A
2,857,983 10/1958 Shada ............................... 184/55 A Primary Examiner—David H. Brown
Attorney, Agent, or Firm—Banner, Birch, McKie & Beckett

[57] ABSTRACT

A wick of a wick oiler for pneumatic devices is accommodated inside a movable body which, in its idle position, seals off an oil-dampened end of the wick from a line passage to a corresponding pneumatic device. When there is an increase in pressure or flow in the line passage the body moves to expose the wick.

5 Claims, 2 Drawing Figures

WICK OILER

BACKGROUND OF THE INVENTION

This invention relates to a wick oiler for pneumatic devices which comprises an oil container and a line passage, between which a wick extends.

Wick oilers of this type, as well as drip oilers have been known for a long time for the internal lubrication of pneumatic devices. Compared with drip oilers, wick oilers have the advantage of providing relatively simple metering during continuous operation. However, in the case of wick oilers, the metering operation still persists when the pneumatic device which is connected downstream is not in use, i.e., when air is not being consumed. The over-oiling which results is tolerable for short periods, but the quantity of oil which is continuously metered in during longer standstill times, may lead to disturbances.

SUMMARY OF THE INVENTION

Thus, an object of the present invention is to provide an improved wick oiler of the initially-mentioned type, such that oil is metered into the air flow for the pneumatic device which is connected downstream, only during actual operation.

According to the invention there is provided a wick oiler for pneumatic devices comprising an oil container, a line passage and a wick which extends into the line passage and into the oil container characterised in that the wick is located within a movable body displaceable between two positions, one position in which the wick is sealed off from the line passage and the other in which a portion of the wick is exposed to the line passage, the displacement of the body being dependent on the pressure or flow condition in the line passage.

In one embodiment of the invention, the body seals off the wick from the line passage when this passage is unpressurized, and when the passage is charged with pressure, a portion of the wick is exposed through displacement of the body.

Thus, a wick oiler according to the present invention is suitable for use with pneumatic devices which are unpressurized during a standstill period and thus in which a shut-off member is positioned upstream of the oiler on the way to the pneumatic device. The term "pneumatic device" is understood as also including installations which comprise several individual devices and are serviced by a single oiler.

If the control is designed such that during the standstill periods of the pneumatic device, a pressure is indeed maintained, but there is no flow, according to another embodiment of the invention, the sealing of the wick by the body and the exposure of the wick is made dependent on the occurrence of flow in the line passage, instead of on the pressure.

In one embodiment of the wick oiler according to the present invention, the body comprises a small pipe which is connected to a piston, and an opening in the pipe containing an end of the wick rests against a sealing surface in the sealing position. Depending on whether the wick oiler is to react to a pressure or to a flow inside the line passage, either the pressure inside the air passage acts on one side of the piston, while the other side is supported by a spring and is loaded by ambient pressure, or the piston is loaded on both sides by the pressure inside the line passage, but the side remote from the spring is connected to the line passage inside a Venturi tube, so that a low pressure arises on this side when a flow is present.

Regardless of this fact, there may, moreover, be a constriction to a Venturi tube in the region of the line passage, inside which the end of the wick is located. In the case of a flow-sensitive wick oiler, a single Venturi tube suffices which is used to move the body via the piston and is also used for an improved spraying action of the oil.

In an idle condition, the wick is preferably sealed off from the air passage by means of a bevel seat. In this case, a bevel is molded on to the opening of the small pipe carrying the wick and the co-operating bevel seat is molded inside the wall of the air passage. One arrangement has proved to be particularly appropriate, in which the displacement of the body, i.e. of the pipe with the piston runs transversely to the longitudinal axis of the air passage.

In the case of larger pneumatic devices, for example, compressed air motors of a comparatively large capacity, and the like, it is particularly appropriate to design the housing of the wick oiler according to the present invention as a flange-mounted construction component, so that it may be directly screwed on to the device, and other lines between the oiler and the device are unnecessary.

BRIEF DESCRIPTION OF THE DRAWINGS

Embodiments of the present invention will now be described by way of example, with reference to the accompanying drawing in which.

DETAILED DESCRIPTION OF PREFERRED EMBODIMENTS

Figure 1:
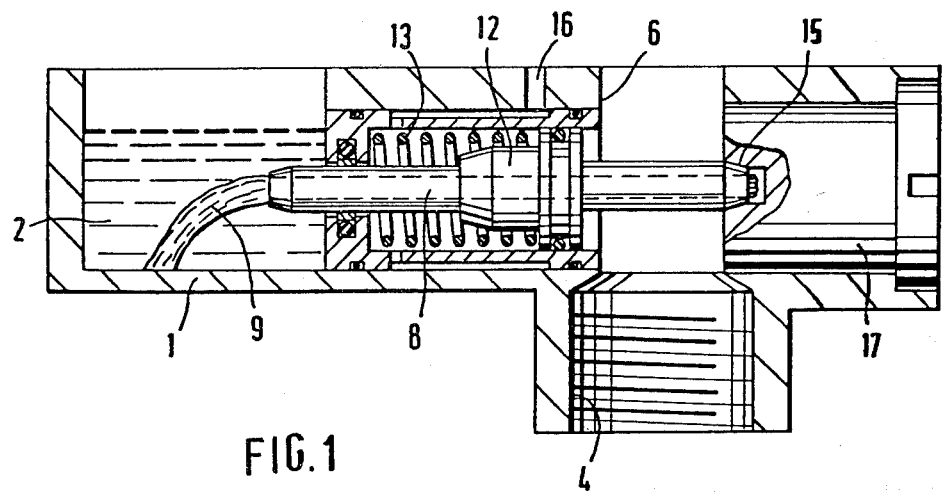
FIG. 1 shows a longitudinal cross section through one embodiment of the wick oiler according to the present invention and FIG. 2 shows a further embodiment of the wick oiler according to the present invention.

An oil container 2 is accommodated inside a housing 1. In the present case, this container 2 is open to the top. This is because this embodiment is a flange-mounted wick oiler, in which the upper seal is not effected by means of a lid, but by the wall of a pneumatic device which is flange-mounted at this point.

An air passage passes upwards from below through the housing 1 and comprises a screw connection 4 with a constriction 6 into which it leads. The constriction 6 opens out directly into the air entry of the flange-mounted pneumatic device.

A body is mounted in the housing 1 between the constriction 6 and the oil container 2. This body comprises a small pipe 8 and a piston 12 which surrounds the pipe. The small pipe 8 carries a wick 9, one end of which lies in the oil container 2 and the other end emerges slightly from an opening of the pipe 8. Due to the suction effect peculiar to the wick 9, the oil is continuously drawn by suction out of the container 2 above to the other end of the wick, even when the level in the container 2 has dropped below the pipe.

The idle position or sealing position is illustrated in the drawing. In this position, the pipe is pressed into one of its extreme positions by a spring 13 engaging the piston 12. In this position the end of the pipe having the opening from which the wick emerges slightly is sealed by seating against a bevel seat 15 provided inside a stopper 17, the end having a co-operating sealing surface. The space below the piston 12 and facing the spring 13 is connected to a vent bore 16 via openings and an annular channel, so that ambient pressure prevails on the side of the piston which is loaded by the spring 13.

As soon as a pressure prevails inside the air passage, i.e. inside the constriction 6, which pressure is greater than ambient pressure, the piston 12 is pushed to the left-hand side, and the bevel seat 15 opens and the oil-dampened end of the wick passes into the centre region of the constriction 6. Due to the flow within the constriction 6 which moves along with the build-up of pressure, particles of oil are entrained by the end of the wick projecting from the opening of the pipe, are atomized and introduced into the pneumatic device for the internal lubrication thereof. As soon as the pressure subsides, the piston 12 and thus the pipe 8 is again pushed to the right-hand side by the spring 13, so as to seat the pipe against the bevel seat 15 again, thereby sealing oil-dampened end of the wick off from the constriction 6 by enclosing it in a cavity in the stopper 17.

Figure 2:
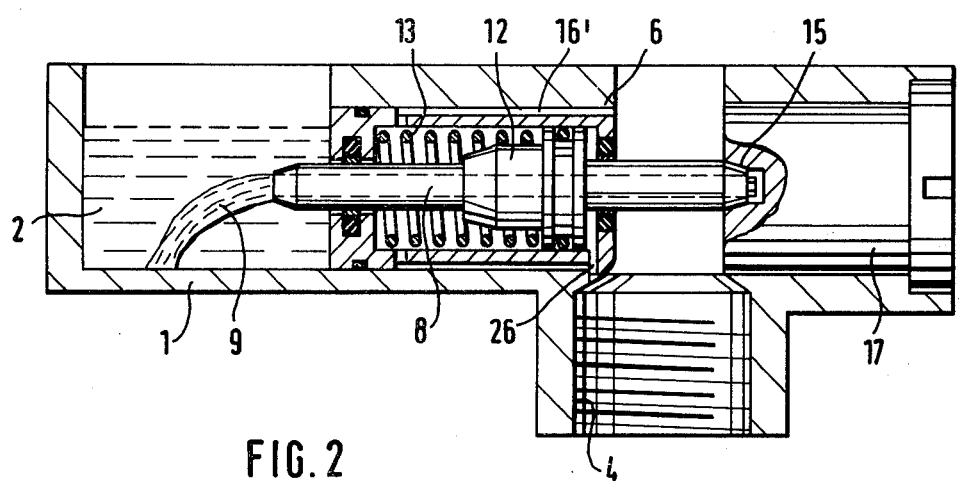

Accordingly, the embodiment which is illustrated is a pressure-sensitive wick oiler. However, if the pneumatic device which is flange-mounted or connected downstream is to be oiled in dependance on the flow rate inside the constriction, an embodiment which differs from the one illustrated in FIG. 1 is required which is shown in FIG. 2. For this purpose, the side of the cylinder which faces the constriction 6 and in which the piston 12 is located is sealed off in a manner corresponding to that side facing the oil container, instead of the vent bore 16, a connection 16' is provided between the side of the piston loaded by the spring and the constriction 6 which acts as a Venturi tube, and the other side of the piston 12 facing the constriction 6 is connected via a passage 26 to the connection 4 which is of greater cross section.

In an arrangement of this type, as soon as a pressure builds up which is not accompanied by a flow, both sides of the piston are each charged with the same pressure, so that the spring 13 ensures a position of the pipe 8 corresponding to the position illustrated in the drawing. However, if air is consumed in the downstream-connected or flange-mounted pneumatic device, a through-flow of the wick oiler occurs, and the pressure inside the constriction 6 acting as a Venturi tube, is smaller than the line pressure inside the connection 4. Consequently, the piston 12 is pushed to the left-hand side against the action of the spring 13, the pipe 8 being entrained. The oil is then introduced in the manner which has already been described above.

We claim:

1. A wicker oiler for pneumatic devices comprising an oil container, a housing having a line passage, a wick mounted in a movable pipe carried by said housing, said wick connecting said oil container and said line passage, one end of said pipe defining an opening through which an end of said wick extends, said opening being sealed against a sealing surface of said line passage in a rest position of said pipe, and a spring biasing a piston carried by said pipe toward said sealed rest position, said piston having one side thereof exposed to pressure within said line passage to move said piston to a delivery position under pressure existing within said line passage.

2. A wick oiler for pneumatic devices comprising an oil container, a housing having a line passage providing a Venturi constriction, means for connecting said line passage to a pressure line, a wick mounted in a movable pipe carried by said housing, said wick connecting said oil container and said line passage, one end of said pipe defining an opening through which an end of said wick extends, said opening being sealed against a sealing surface of said line passage in a rest position of said pipe, a spring biasing a piston carried by said pipe toward said rest position, said piston moving said pipe to a delivery position under different pressures on opposite sides of said piston, and means for connecting one side of said piston to the pressure line and the other side of said piston to said Venturi constriction within said line passage.

3. A wick oiler according to claim 1 or 2, wherein said opening of said pipe and said sealing surface in said line passage have a bevel shape.

4. A wick oiler according to one of the claims 1 and 3, wherein the direction of movement of said pipe extends transversely to the direction of said line passage.

5. A wick oiler according to claim 1 or 2, further comprising said housing having a flange mounted construction component, and wherein said line passage opens through said component directly into a flange mounted pneumatic device when connected to said wick oiler.

* * * * *